(12) United States Patent
Alpert et al.

(10) Patent No.: US 10,958,357 B2
(45) Date of Patent: *Mar. 23, 2021

(54) DISTRIBUTED OPTICAL RESONATOR WITH THIN RECEIVER UNIT

(71) Applicant: Wi-Charge Ltd., Rehovot (IL)

(72) Inventors: Ortal Alpert, Ness Ziona (IL); Yoni Cohen, Jerusalem (IL); Ori Refael Mor, Tel Aviv (IL); Omer Nahmias, Aminadav (IL); Eitan Ronen, Rehovot (IL); Lior Golan, Ramat Gan (IL)

(73) Assignee: WI-CHARGE LTD., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/658,292

(22) Filed: Oct. 21, 2019

(65) Prior Publication Data
US 2020/0052798 A1 Feb. 13, 2020

Related U.S. Application Data

(63) Continuation of application No. 15/548,175, filed as application No. PCT/IL2016/050120 on Feb. 2, 2016, now Pat. No. 10,454,593.

(60) Provisional application No. 62/125,829, filed on Feb. 2, 2015.

(51) Int. Cl.
*H04B 10/80* (2013.01)
*H01S 3/08* (2006.01)
*H04B 10/69* (2013.01)

(52) U.S. Cl.
CPC ........... *H04B 10/807* (2013.01); *H01S 3/08* (2013.01); *H04B 10/69* (2013.01)

(58) Field of Classification Search
CPC .......... H04B 10/807; H04B 10/69; H01S 3/08
See application file for complete search history.

(56) References Cited

U.S. PATENT DOCUMENTS

2009/0103925 A1* 4/2009 Alpert .................. H04B 10/807
398/130

* cited by examiner

*Primary Examiner* — Mina M Shalaby
(74) *Attorney, Agent, or Firm* — Maine Cernota & Rardin

(57) ABSTRACT

A receiver for receiving an incident beam of optical power from a remote transmitter over a predefined field of view, comprising an input lens having a high durability coating that can withstand domestic handling and contamination. Such a high durability coating may reflect a non-insignificant part of the light incident thereon. Behind the lens, there is fitted a retroreflector disposed such that it reflects that part of the incident beam traversing the lens, back through the lens to the transmitter. Reflections from the front surface of the lens impinge on one or more transparent beam catchers appropriately located, and equipped with energy conversion devices, such as photovoltaic cells, to convert light from the reflections of the incident beam into electricity. Additional energy conversion devices may be located inward of the lens, to collect and convert reflections from the inner surface of the lens, of light returning from the retroreflector.

8 Claims, 5 Drawing Sheets

DISTRIBUTED OPTICAL RESONATOR WITH THIN RECEIVER UNIT

RELATED APPLICATIONS

This application is a Continuation of U.S. patent application Ser. No. 15/548,175, filed Aug. 2, 2017, which is a National Phase application filed under 35 USC § 371 of PCT Application No. PCT/IL2016/050120 with an International filing date of Feb. 2, 2016, which claims priority of U.S. Patent Application 62/125,829 filed Feb. 2, 2015. Each of these applications is herein incorporated by reference in their entirety for all purposes.

FIELD OF THE INVENTION

The present invention relates to the field of optical power transmission between a transmitter and a receiver, connected as complementary parts of a distributed optical resonator operating as a long laser, especially for the purpose of transferring power to a thin hand-held mobile electronic device from a centrally located transmitting unit.

BACKGROUND OF THE INVENTION

In prior art patent documents U.S. Pat. No. 4,209,689 to G. Linford for "Laser Secure Communications System", WO 2007/036937 for "Directional Light Transmitter and Receiver", WO 2009/083990 for "Wireless Laser Power Transmitter" and WO 2012/172541 for "Spatially Distributed Laser Resonator", the latter three having a common inventor with the present application, there are described various distributed resonator laser systems. All of the distributed resonator systems described in that prior art include a transmitter which incorporates a gain medium and a retro reflector acting as one mirror of the lasing system, and a receiver which also incorporates a retro reflector which can act as the second mirror of the lasing system and an output coupler for extracting the energy from the resonator.

In the case of WO 2012/172541, various optical elements are also incorporated to manipulate, monitor, and control the beam. Additionally, there is also taught therein elements such as beam blockers and irises, for blocking or avoiding unwanted reflections from the receivers. Such reflections could be a potential safety hazard.

The receivers described in the prior art may not be optimum for use in modern portable electronic devices, such as cellular phones and tablets, or even laptop PCs, as they are generally too large, and especially too deep. Furthermore, they may be unsuitable for use in the consumer environment, since, given the power requirements of cellular phones and other portable electronics devices, which is reflected in the power level circulating in the distributed laser cavity, they may not fulfil safety regulations. This is particularly so in an environment where finger prints, dirt, spilled liquids and the like are a reality of life, and their presence on the surface of the light receiving element of the receiver may compromise any safety measures taken to prevent stray laser emission.

Such systems can potentially be used to transfer energy to a remote device, such as a cellular telephone, and charge it. Eliminating or reducing the need to charge the phone by a cord, or by being placed on an inductive charging mat, therefore extends the time a device can operate between connections to a wall charger or being placed on a static charging mat.

As an example of the requirements of such a receiver, a receiver incorporated into the body of a cellular telephone, aimed at charging it, would typically need to have the following limiting parameters:

(a) Thickness preferably less than 6 mm.
(b) Radiation emissions limited, such that they are not a safety hazard. Typically, they should be less than the levels specified in the IEC60825 standard.
(c) Capability of generating at least 1 W of power
(d) A field of view of at least ±30 degrees, where the field of view is the sum of all angular directions from which the receiver could receive power, if a properly aligned transmitter were to transmit power thereto.
(e) The transmission range should be at least 3 meters.

Some of the above characteristics are more and some less critical. The first two criteria are perhaps the most important. The thickness is mandated by the thickness of mobile electronic devices such as cellular telephones. Unless the thickness is limited to that of these devices, typically 6 mm, the receiver solution may not be commercially acceptable. Therefore it is important to provide receivers sufficiently thin for inclusion within the thickness of such portable devices, where the field of view of the receiver faces in a direction generally towards the normal to the large surface of the device, since that is the position in which such devices are usually held. With regard to criterion (b), the front surface of the optical input element of such devices, on which light impinges before entering the receiver, is a particularly problematic feature, since reflections from that front surface may be a main source of safety problems with the receiver. Therefore, it would be important to provide an optimized coating for the front surface of such a receiver input element, to prevent or reduce such reflections to meet the relevant safety standard maximal permissible exposure (MPE). Furthermore, the optical beam blocking arrangement used should be such as to prevent unwanted reflections above the MPE from being directed in directions other than back to the transmitter unit.

Such receivers typically consist of a lens and a partially reflective mirror at its focal plane, such as can be seen in FIG. 7 of the above referenced publication WO 2012/172541. The front surface of the lens reflects some of the light impinging upon it, and such reflection can be controlled and minimized but cannot be completely eliminated. Such systems are limited in the amount of power they could safely transmit, as some of the power will always be reflected by the front surface. In such prior art systems, this surface is coated with an anti-reflection (AR) coating for at least some of the following reasons:

1. Safety—Optimizing the system for higher power transmission requires very low reflection from the front surface so that it would not exceed the maximal permissible exposure (MPE), such as that mandated by IEC60825. This would require having the front surface coated with anti-reflective (AR) coating, reflecting as little as possible light of the incoming light and therefore creating the least hazard.
2. Increasing efficiency and usefulness—Such AR coating would also improve the overall system efficiency. Reflections from the front surface represent a power loss, and losses reduce the system's efficiency dramatically as they compete with output coupling. To achieve minimal losses, the front surface should have a coating having a reflection as low as possible.
3. Increasing field of view—since symmetrical receiver configurations create the widest field of view, as they are indifferent to the direction the beam comes from, the front surface of the input lens of the receiver should be a spherical or nearly spherical surface. The radius of curvature of such a surface should be chosen to be minimal as this would serve to make the reflected beam intensity decrease rapidly with distance from the receiver as the beam diverges, so that it poses reduced risk after a short distance.

For a receiver with a large field of view, there are additional specific advantages for the use of such an AR coating:
(a) Without an AR coating, such a surface would have different Fresnel reflection/transmission properties at different angles and this may distort the beam's wavefront.
(b) The large field of view makes it difficult to use other means such as beam blockers to block the light reflected from the front surface. Such physical beam blockers are simpler to design when the field of view is small.

However, the use of an AR coating on a domestically used device such as a cellphone is problematic, since in such a consumer environment, dirt, spilled liquids, dust, fingerprints, and similar layers on top of the AR coating will amend the effectiveness of the AR coating, leading to higher reflections, and secondly, may eventually lead to degradation and peeling of the AR coating, again compromising safety. Therefore, alternative solutions must be found in order to reduce potentially dangerous reflections from the input optical surface of the receiver.

Other alternative solutions have been proposed, but each of these solutions has its own disadvantages:
1. Increasing the beam diameter so much that reflection from the receiver lens would be at a size and intensity so that it would be safe. Typically, a beam diameter of more than 7 mm would be required, which is the standard aperture used in IEC60825. However, using this technique, the size of the beam needed to transmit the power required by a mobile device may be bigger than the entire area available for a receiver on the mobile device! For example, to supply power in the range of between 1 and 5 W, as needed to charge cellphones of various sizes, and using 20% photovoltaic efficiency, an optical power in the range of at least 5 to 25 W is needed. Taking into account that an uncoated glass surface reflects about 4% of the power incident on it, the range of optical power that needs to be transmitted ranges from at least 5.2 to 26 W. The MPE for 1400 nm light according to the IEC60825 ($2^{nd}$ edition) is of the order of 40 mW/cm$^2$, Taking into account the field of view required (at least ±30 degrees) a beam having a diameter of approximately 3 cm would be required to charge the phone. Such a large beam cannot be input through the surface available for that purpose in a modern cellphone.
2. Using a beam block, typically made of an absorbing "black" material which essentially absorbs 100% of the light received by it. Its surface is typically a non-flat diffuser, so that light reflected by it would be diffused and pose minimal risk. However, using a beam block, of the type that is described in the above referenced WO 2007/036937, involves a significant thickness increase of the receiver as can be seen in FIG. 1 of that application. A beam block would have to be block any reflected beams within the field of view (FOV), which are typically reflected at a wider angular spread compared to the FOV, but at the same time, not block any beam within the field of view. Such a beam block height would have a very significant impact on the overall receiver height.
3. Diffusing the beam impinging on the receiver lens front surface—however this solution is not suitable for use inside a laser resonator, as it would distort the laser beam in a way that would not allow the wave front to be recreated after a round trip.

In the light of all of the above described disadvantages, it is clear that alternative solutions must be found in order to reduce potentially dangerous reflections from the input lens of the receiver.

Furthermore, in such prior art receivers, a single photovoltaic cell is generally placed directly behind the back mirror output coupler of the system, at a suitable distance so that the beam is spread to the diameter where maximal efficiency of the photovoltaic cell is achieved. This also increases the overall depth of the receiver, which is disadvantageous for such an application. It is clear that the prior art positioning and configuration of the photovoltaic cell(s) has a number of disadvantages, the trade-off between which is always a compromise to performance.

There therefore exists a need for a thin receiver unit of a distributed laser resonator which overcomes at least some of the disadvantages of prior art systems and methods.

The disclosures of each of the publications mentioned in this section and in other sections of the specification, are hereby incorporated by reference, each in its entirety.

SUMMARY

The present disclosure describes new exemplary systems for the receiver units of a distributed resonator laser power transmission system, utilizing novel configurations to overcome the above mentioned disadvantages of the prior art systems. A combination of a robust front optical surface, such as a high abrasion resistant coating or a high abrasion resistant glass, a small beam block input beam size, and selected photovoltaic cell position has to be used in order to constitute a safe thin receiver.

Some exemplary systems described in this disclosure overcome these problems, and attempt to fulfil at least some of the criteria mentioned hereinabove, by using a combination of the following techniques:
(a) A front surface, or a front surface coated with a coating, which is durable enough to withstand normal wear and tear, but which is optimized primarily for durability, and only then for AR, if at all.
(b) Use of a beam blocker which collects the above-mentioned reflected light from the front surface coating, or from the front surface itself if uncoated; and
(c) manipulation of the diameter of the transmitted beam impinging on the receiver by use of a dynamic focusing system in the transmitter unit for adjusting the position of the focus of the transmitted beam. The focussing system may be passive or self-adjusting.

Most anti-reflection coatings, especially those with very low reflectivity of the order of 0.1% or better, cannot withstand typical use by a domestic user, such as normal scratching, or wear and tear. Furthermore, their reflection will increase when coated with a layer of liquid, which may be very common in normal use of consumer products such as cellphones. In order to reduce the effect of local conditions on the level of light reflected from the optical input element, the coating on the front surface may be selected not to decrease the reflection to a minimum, but rather to reflect at least a certain level of the light impinging upon it, such a level of reflection generally having a significantly lower dependence on the surface conditions, than a specifically designed low reflection coating. However, such a level of reflected light creates a safety risk unless properly blocked or diffused and will also reduce system efficiency significantly.

To avoid the above problems, the optical systems of the current disclosure differ from conventional laser cavities in that they use the front optical surface of the receiver as an output coupler instead of having the output coupler at the end mirror, as is normal in prior art laser systems. Prior art lasers generally position the output coupler as the mirror at the remote end of the cavity. This configuration yields minimal losses, since the output coupled beam traverses the output coupler only once in each round trip, and this conventional configuration also requires a minimal number of components, has minimal aberrations and most importantly, involves a single output coupled beam, emitted in a known position and of a known size towards a known direction, which can readily be directed onto a single photovoltaic cell. The positioning of the output coupler on the front optical surface of the receiver, as used in the systems of the present application, has the disadvantage that the output coupled light is extracted from two beams coming from unknown positions on the front surface, in unknown directions, and which are difficult to collect and to direct onto a photovoltaic cell.

However, a first important advantage which this configuration provides is that the front surface does not need to be coated with an anti-reflective coating since the reflection therefrom is positively used to constitute the output coupled power (and would therefore be blocked and absorbed by (two) photovoltaic cells), and the front surface can thus be optimally coated with a coating which provides durability and scratch resistance, rather than minimal reflectivity.

A second advantage is that if a liquid is spilled on the front surface, or if the front surface is contaminated with dirt or fingerprints, or if a flat reflector is inadvertently placed on the front surface, the light reflected by the reflector or the front surface of the liquid will be reflected in essentially the same direction as the output coupled light and therefore collected by the collection system instead of posing a safety risk. This configuration therefore allows all reflections from the front surface to be safely blocked, absorbed or diffused, and also enables efficiency to be high, even when this surface is coated with a coating reflecting more than just small fractions of a percent.

Additionally parts of the input optical surface can be made of a light absorbing material, such as a Photovoltaic cell (PV cell) which will further reduce the risk of stray light reflection. In addition, in some configurations where the entire front surface need not be of good optical quality, parts of the front surface may be adapted to diffuse the reflected beam for increased safety.

In order to mitigate the problem of the beam being reflected from an unknown position, the receiver may advantageously have an optical design such that its entrance pupil is located in the vicinity of the front surface, this minimizing both the size and complexity of the optical collection systems as well as the overall surface "footprint" of the aperture on the device, since the entrance window needed would be similar to the beam size, and not to the beam size summed over the entire field of view.

If the front surface acts as an output coupler, the beam block blocking the reflection from it needs to match the front surface and becomes a "smart beam block", with additional capabilities beyond just absorbing the light, which is what a conventional beam block does. Firstly, it needs to be able to collect the light coming from the input pupil of the receiver from all directions, and to use it by converting it into a useful form of energy, such as directed and localized optical power, heat, or electrical power. If electrical power is needed then typically the size and shape of the beam would have to be optimized for a photovoltaic cell, which typically performs best with a flat beam profile and not the Gaussian-type beam profile generated by the system. To convert the beam profile to a flat shape, a hologram, a lenslet array, a shaping prism, a light-guide beam scrambler, or a diffuser may be used.

Additionally, the "smart beam block" may also perform other functions, such as monitoring the incoming light in order to detect other risks such as contaminations on the surface of said receiver, or to detect data transmission "riding" on the beam.

In order to successfully perform the above functions, the front surface of the beam block should typically be transparent or semitransparent, allowing the light to enter the beam block, where additional optical and electro-optic components may perform functions on said light, before it is absorbed as ultimately intended. Alternatively the front surface may be made out of an electro-optical active material, such as a semiconductor, that may directly convert the light energy into electricity, as a more useful form of energy. In such a case, the front protective cover of the photo-voltaic cell may be considered to be the input to the reflected beam blocker. The semiconductor may also be "segmented", with each segment providing information about portions of the beam, so that data on the beam shape, and possible contaminations on the front surface may be gathered.

Many such "smart functions" may also be performed by a "smart" output coupler. Thus, detectors for detecting beam shape and surface contaminations may be embedded in or just behind the front surface. Markers for detection and identification of the receiver by the transmitter, such as a bar-code or other optical code with identity information identifying the receiver, may also be embedded within the front surface. Energy converters, heat removal units, retro reflectors, diffusers and signaling systems (such as LED diodes optically signaling to the transmitter) may also be embedded in the front surface. Such sub systems in the front surface should be built in such a way so that they do not reduce the quality and quantity of the returning signal below the point allowing the transmission system to continue to operate, hence those should preferably be embedded in the outer part of the front surface, and further preferably be embedded behind a protective front cover which is made to be durable.

The optical focusing system of the receiver can be either lens based or mirror based. If mirror based, the input and focusing unit can be conveniently implemented in the form of a solid prismatic block of optical material such as glass, with the input surface being optionally planar, and with the focusing mirror formed as a concave, preferably conic, surface on which the beam impinges and is focused onto a second mirror operative as the retro reflector.

Whether a lens or a mirror focusing element is used at the optical input of the receiver, there will typically be two reflections formed at the input window—one from the transmitted beam incident externally on the receiver and one from the beam returning from the retroreflector, incident internally on the input window, and passing through the input window in the other direction, outwards towards the transmitter. Since the receiver optical system has an output coupling and loss ratio which is determined by its design, the ratio of power between the two beams would be approximately constant As an example to illustrate this, if the incoming beam is 10 W (optical) and the front surface output coupler, being uncoated, reflects 4% by Fresnel reflection, then the output of the first beam would be 400 mW, and the returning beam would be 0.04*9.6 W=384 mW, and even if the incoming power fluctuates, the ratio of output coupling 1 and output coupling 2 would remain constant. Therefore, unless a system could be designed with output coupling exceeding 50%, which is not normally possible using gain media suitable for distributed resonators, it is important to utilize both beams in extracting energy from the cavity, and the optical beam block geometry must be arranged such that both beams are collected, and the output from both collection systems typically need to be summed.

The collected light from each of the reflections may conveniently be coupled into its optical waveguide or optical fiber, and the optical power in both of these waveguides or fibers may be combined and used directly. In the case of electrical outputs, separate photovoltaic cells may be used at the ends of the waveguides or optical fibers, and their outputs typically summed. There will be a typically small, typically fixed, difference in the power received by the two photovoltaic cells, since the externally reflected light has undergone only one reflection on the input surface, while the internally reflected light has undergone two reflections on the input surface. The difference is only of the same order as the percent reflection of the light from the input surface. However, in order to maintain balanced operation and conversion with maximum efficiency, a current matching device should be used. Such a power matching device could be a DC/DC converter on at least one of the photovoltaic cells or an optical assembly diverting more power to the internal reflection cell, in order to compensate for its lower input power. Alternatively, a third cell may be used which may receive some of the power impinging on one of the first two cells, so that the first two cells, or preferably all 3 cells are "balanced" and can be efficiently combined. For example, in the simplistic case of 50% output coupling, the beam coming from the transmitter to the receiver would couple 50% of its power into a first channel, and 25% (50% of 50%) of its power again returning from the receiver to the transmitter. Since the first channel is exactly two times the second channel, if power from the first channel is evenly split between two photovoltaic cells then all three PV cells will receive exactly the same power.

The thickness of modern cellular telephones and tablets is generally made as small as possible, because of consumer preference and requirement. In conventional laser design, the number of surfaces inside the laser resonator is reduced as much as possible, since each additional surface creates an additional loss in both the forward and backward propagation direction of the laser light, and those losses are in competition with the output coupling and thus may reduce efficiency significantly. In contrast to such conventional designs, the optical receivers of the present disclosure may use folding mirrors, in order to fold the retroreflector and collection systems, such that they lie in the plane parallel to the front surface of the device, in order to minimize the thickness of the optical receivers while still keeping the field of view centered orthogonal to the surface of the cellular telephone such that it can be charged from a transmitter placed on the ceiling when the telephone is placed lying on a table.

Other functions that could be performed by the "smart beam block" or "smart front surface" include manipulating the beam shape, typically to either improve photovoltaic cell efficiency by homogenizing the beam, or in order to bring light coming from different directions to a specific small point in space, typically in order to couple it into a waveguide, or diffusing the light typically for safety or illumination purposes Other functions may include converting the light to one or more wavelengths, for example, creating RGB light from the lasing light, typically by upconverting the photons for wireless illumination purposes. This may be done by using Yb doped glasses, or other transparent materials doped with fluorescent materials and absorbing materials such that energy is upconverted and transformed. For example, laser light can be absorbed by a transparent glass doped with Yb, which has a very wide absorption around 1000 nm. Such a dopant may absorb the light and transfer its energy to other co-dopants that may absorb energy and eventually emit their energy as fluorescent light. The pupil of the receivers described in the prior art, such as in the above mentioned WO 2012/172541, is typically located at the center of the lens used, or, in the case of a telecentric optical system, one focal length in front of the input optical aperture plane, or a similar distance within the receiver. Placing the pupil near the front surface reduces the field of view and significantly limits the possible optical designs that could be used. Furthermore, a requirement that the front surface be flat, or nearly flat, typically causes aberrations that reduce system performance. However, in the optical systems of the current disclosure, in contrast to prior art system design, the pupil is arranged to fall close to the front surface, and the front surface is made flat, or nearly flat. Making the front surface flat, or nearly flat, and designing the pupil to be close to it, substantially minimizes the size and complexity of the smart beam block collection systems, since all of the beams handled over a range of incidence angles, pass through the pupil of the system, thereby significantly simplifying the optical design. Such a design, where the entrance pupil is placed on the front surface of the receiver, also minimizes the area of the input window needed on the front surface of the device, surface area which may be crucial in many such mobile applications such as cellular phone design not only from a marketing point of view but also as it is proportional to the overall thickness of the device.

The output coupling level in prior art conventional laser systems is typically adjusted to provide optimal performance of the gain medium, this resulting in maximal lasing efficiency. Using this prior art conventional criterion, the effect of dust/finger print and other surface losses would be taken into account and the final design, based on conventional wisdom, would require the receiver system to couple LESS light out and reflect MORE light back to the transmitter compared to the levels that would have been selected to optimize gain medium utilization in the absence of such losses. Such a system will thus continue to operate even if the front surface of the receiver is soiled with fingerprints or dirt arising from to day-to-day consumer use.

The optimum output coupling factor for such a conventional laser design is well known in the art, as given in a number of textbooks, especially as derived in the classic work by A. E. Siegman entitled "Lasers" published by University Science Books, (1986), where there is stated on page 479 under the heading "Optimum Output Coupling Factor" (with some of the mathematical details omitted for simplicity):

"For any of the lasers shown in FIG. 12.11 or 12.12 (not shown herein) there is obviously a maximum allowable output coupling, . . . beyond which the cavity is overloaded, so that total cavity losses exceed the available gain, and no oscillation is possible. As the cavity coupling or end-mirror transmission is reduced below this value, both the circulating intensity and the output intensity increase with decreasing coupling. Below a certain optimum coupling factor . . . , however, the mirror transmission decreases faster than Icirc increases, and the power output decreases, eventually becoming zero at zero transmission through the end mirrors. The laser at this point is, of course, still oscillating—in fact, oscillating the strongest of all—but with all its available power being uselessly dissipated in the internal cavity losses.

FIG. 12.15 (not shown herein) illustrates in more detail how the laser output intensity for a typical laser depends on the cavity output coupling, assuming a fixed value of 20% power gain per round trip, and varying amounts of internal cavity loss. It is evident that for each different value of internal cavity loss there is a different optimum output coupling which maximizes the output power. It is also apparent that the optimum output coupling is always considerably smaller than the available gain, and that even very small internal losses have a very serious effect on the maximum useful output power available from the laser."

However, contrary to this conventional wisdom, as expressed by Siegman's optimal recommendations, the systems described in this disclosure generally use total output coupling—resulting from the sum of the output coupling of both beams—greater than that determined for the optimum of the gain medium. This unconventional design step is taken purposely in order to provide two advantages:

(a) Such a system is more tolerant to the effect of finger prints and other "parasitic" losses on the output coupler. The term "parasitic" losses is applied here to losses that are not due to components inserted into the laser by the laser designer but rather are introduced into it by the use of the system. Such parasitic losses are negligible in conventional laser design but are critical in the context of the current described systems.

(b) Furthermore, such a system will be safer, as lasing would collapse if a reflector were to be inadvertently placed on the front surface. Contrary to conventional laser systems, where such a collapse would be considered a malfunction, in a system such as those shown in the current disclosure, it is a required feature.

As an example, if the gain medium of a certain laser works optimally with 90% of the light reflected back to it, conventional wisdom would dictate coupling <10% of the light out of the resonator while reflecting more than 90% of the light back towards the transmitter, so that when an additional loss is inserted into the system, the system would continue to operate. The above mentioned Siegman reference, as well as almost any laser textbook, give a formula for this number. However the cavity designs shown in the present disclosure may chose to couple out more than 10% of the light, and reflect back less than 90% of the light, so that although the system would be less efficient, it would benefit from an additional safety factor thanks to two factors:

(a) The circulating power inside the resonator would be lower.
(b) The system's "self terminating" safety effect would become stronger.

In order to construct an optical receiver that would fit into a thin portable electronic device, such as a cellphone or a tablet computer, the optical thickness of the retroreflector and the height of the beam block needs to be minimized. Since both of these heights are proportional to the size of the pupil, the optical receiver systems of the current disclosure attempts to minimize the diameter, or overall size, of the entrance pupil, at the cost of complicating the transmitter and receiver systems. It is important that the pupil diameter should not be too small, since producing a beam of diameter below approximately 0.3 mm radius, requires the use of very large optics in the transmitter to support the numerical aperture needed. This in turn would make the transmitter large, expensive and slow to focus. It is also important not to allow the intra-cavity optical intensity (W/cm$^2$) to become more then the damage threshold of the receiver optical components or more than the threshold at which dust in the air ignites. For this reason, an optimal focusing lens for the transmitter would generally have a numerical aperture of less than 0.01, and optimally around 0.001.

There is thus provided in accordance with an exemplary implementation of the devices described in this disclosure, a receiver for receiving an incident beam of optical power from a remote transmitter over a predefined field of view, comprising (i) an optical input element positioned such that it can receive the beam of optical power over the field of view,
(ii) a retroreflector disposed such that it reflects back towards the optical input element, that part of the incident beam of optical power traversing the optical input element,
(iii) at least one reflection blocking element having a transparent optical impingement surface, disposed such that reflections of part of the incident beam off the external surface of the optical input element, impinge on the transparent optical impingement surface, and
(iv) at least one photovoltaic cell disposed behind the transparent optical impingement surface, to convert light from the reflections of part of the incident beam into electricity.

In such a receiver, the transparent optical impingement surface may be the entrance window of the at least one photovoltaic cell. Additionally, it may be the entrance window of a light guide, having the at least one photovoltaic cell disposed at an end of the light guide remote from the transparent optical impingement surface.

In any of the above described receivers, the optical input element should have an external optical surface having a mechanical durability selected to withstand a predetermined level of handling. This external optical surface may comprise either a glass produced to have a high resistance to mechanical damage or a glass having a scratch resistant coating thereupon. In either of such cases, the predetermined level of handling should be determined according to the expected effects of domestic use of the receiver.

Additionally, such receivers may further comprise at least a second photovoltaic cell disposed internally from the optical input element, such that it receives reflected light from the optical input element arising from that part of the incident beam of optical power retroreflected back towards the optical input element. In that situation, the receiver may further comprise a light guide for conveying the reflected light to the at least second photovoltaic cell.

Still other example implementations involve a receiver for receiving an incident beam of optical power from a remote transmitter over a predefined field of view, the receiver comprising:

(i) a lens having a front surface,
(ii) a retro reflector disposed within the receiver such that it retroreflects parts of said incident beam traversing the lens back to the lens, and
(iii) at least one beam block, disposed such that it intercepts reflections of part of the incident beam off the front surface of the lens, the beam block being equipped with an energy conversion device, wherein the front surface of the lens has a reflectivity of at least 0.01%, and has either a high durability coating or is constructed of a scratch resistant glass selected to withstand a predetermined level of handling. In such a receiver, the energy conversion device may comprise a photovoltaic cell. Such a receiver may further comprise a beam homogenizer disposed between the beam block front surface and the photovoltaic cell.

In the above described receivers, the retro reflector may have a pupil located close to the front surface of the lens. The location of this pupil close to the front surface may be achieved by disposing the retroreflector substantially at the focal plane of the lens.

Furthermore, in the above described receivers, the coating may have a predetermined level of resistance to at least one of scratches, spills and fingerprints.

According to yet further implementations, the energy conversion device may be a heat generator.

Finally, the receivers may further comprise an additional energy conversion device disposed such that it intercepts internal reflections of part of the incident beam off the front surface of the lens, arising from parts of the beam returning to the optical input element from the retroreflector.

Yet another implementation of the receivers of the present disclosure may further involve a receiver for optical power transmission, the receiver comprising:
(i) an input optical receiver unit comprising a block of optically transparent material, the block comprising an input surface, a concave focusing mirror and a retroreflector mirror disposed at the focus of the concave focusing mirror, and
(ii) at least one beam block, disposed such that it collects any light reflected from the input surface, the beam block being equipped with an energy conversion device,
wherein the input surface has a reflectivity of at least 0.01%, and has a coating having a durability such that the input surface can withstand a predetermined level of domestic wear and tear.

Finally, according to yet another exemplary implementation of the devices of the present disclosure, there is provided a receiver for optical power transmission, the receiver comprising:
(i) a lens having a front surface, the lens being disposed in an optical entrance aperture of the optical receiver,
(ii) a mirror disposed inwards of the lens relative to the incident direction of the optical power transmission, such that the lens and the mirror define a retro-reflector, the lens being disposed such that the entrance pupil of the optical receiver lies at the front surface of the lens, and
(iii) at least one photovoltaic cell disposed in the optical aperture in the plane of the lens,
wherein the photovoltaic cell has an area substantially larger than that of the front surface of the lens, such that a majority of the optical power incident on the entrance aperture is absorbed by the photovoltaic cell.

Such an optical receiver may further comprise at least one beam block, blocking essentially all reflections from the front surface of the lens, of the optical power coming from the field of view. Such a beam block may comprise a second photo voltaic cell for absorbing the reflections of beams coming from the field of view, and this second photovoltaic cell may be disposed surrounding the lens.

BRIEF DESCRIPTION OF THE DRAWINGS

The present invention will be understood and appreciated more fully from the following detailed description, taken in conjunction with the drawings in which:

FIG. 5B illustrates a specific geometrical arrangement, in which the entrance pupil of the optical input system is located on the surface of the lens, while

DETAILED DESCRIPTION

Figure 1:
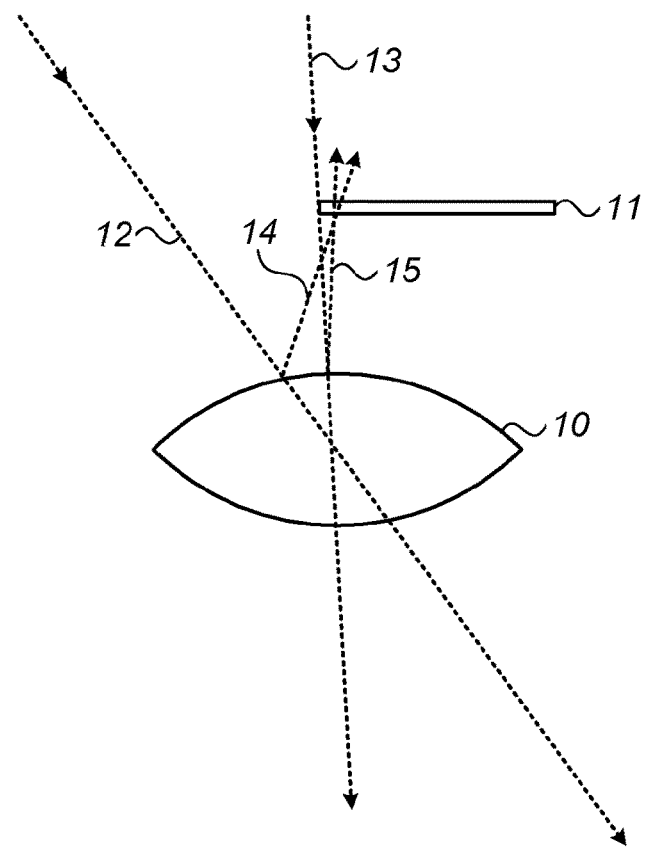
FIG. 1 shows a prior art receiver using an optical absorber baffle to absorb light reflected from the front surface of its input lens.

Reference is now made to FIG. 1, which illustrates schematically the input lens 10 of a prior art receiver using an optical absorber baffle 11 in order to absorb light reflected from the front surface of the lens. The baffle 11 is located in its predisposed lowest position shown in FIG. 1, so that the outermost limits 12, 13 of the fields of view of incident beams, as limited respectively by any input aperture (not shown) and by the edge of the baffle 11, result in beams 14, 15 reflected from the front surface of the lens, and stopped by the baffle. However, as is observed in FIG. 1, in order to prevent any of the beams within the field of view 12, 13, from being reflected back towards the environment around the receiver, even this lowest position of the baffle is noticeably distant from the front surface of the lens, thereby increasing the effective height of the optical receiving system. This prior art solution is therefore generally impractical for use on thin consumer electronics devices.

Figure 2:
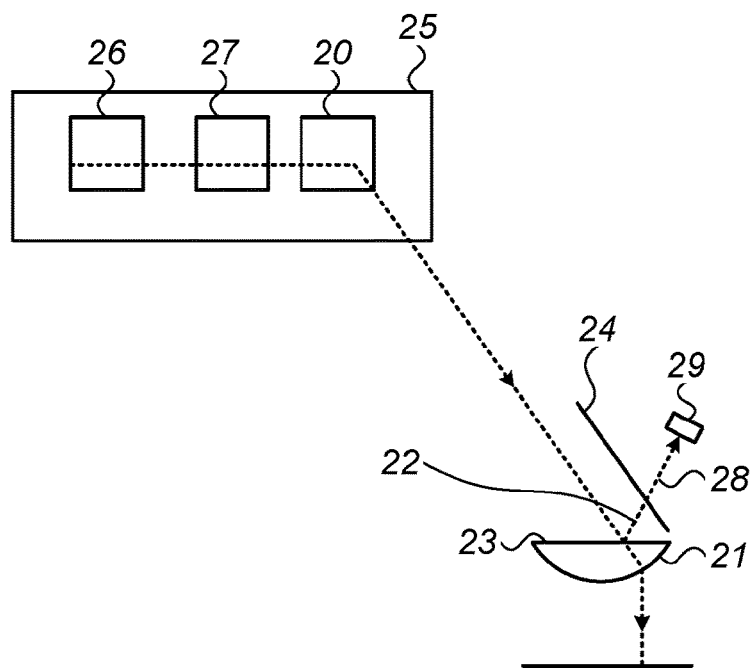
FIG. 2 is a schematic representation of a distributed resonator lasing system, according to one exemplary implementation of the systems of the present disclosure.

Reference is now made to FIG. 2, which is a schematic representation of a distributed resonator lasing system, according to one exemplary implementation of the systems of the present disclosure. The system has a number of features which differ from those of the prior art systems shown hereinabove.

In the first place, the transmitter unit 25, besides the gain medium 27 and the retroreflector 28, there is a dynamic self-adjusting focusing element 20 in order to ensure that the focal point is generated on the lens 21 of the receiver. Dynamic focussing may be defined as relating to a system where the diameter, wave-front radius of curvature and $M^2$ value of the beam leaving the transmitter is dependent on the distance from the transmitter to the receiver. This dynamic focusing element ensures that the beam impinging on the receiver has three characteristics:
(i) it is not significantly larger than the front surface optical entrance aperture of the receiver, which may be semi-transparent either by means of partial reflection from the whole area, or by means of full retro-reflection from certain portions of the area, usually the center of the aperture, and output coupling from other areas. Typically, for use in a mobile hand-held device, such as a cellular telephone, the size of the entrance pupil should be smaller than about 2 cm to fit comfortably on the front surface of a cellular phone.

(ii) it does not yield power densities greater than a threshold level which could damage the optical surfaces of the input lens (i.e. it does not focus too much); and (iii) it maintains the desired focused diameter at the receiver, by either optical, mechanical, electronic, active or passive means, despite the changing distance from the transmitter to the receiver as the position of the receiver is changed.

Figure 3:
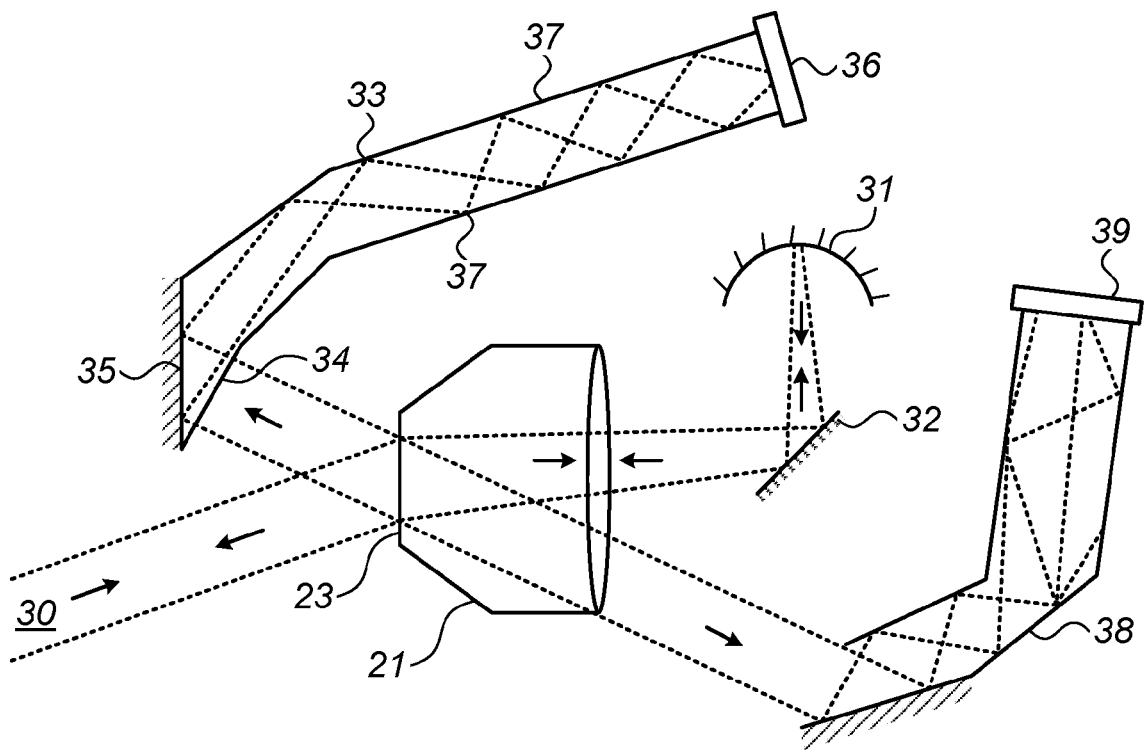
FIG. 3 is a detailed schematic illustration of one exemplary implementation of the receiver configuration shown in FIG. 2, using an input lens focusing element.

The input lens 21 inside the receiver may advantageously have a front surface 23 which is essentially flat, and a back surface which is typically an aspheric surface, as will be shown in FIG. 3. Additionally, the front surface 23, since it is intentionally coated with a durable rather than an antireflective coating, reflects a part 22 of the incoming beam. In order to resist everyday wear and tear, it should be constructed of a scratch resistant glass, such as Gorilla Glass®, supplied by Corning Incorporated of Corning, N.Y., USA, which may also be treated with a scratch resistant coating. A reflection of the order of 3% to 6% is typically obtained. Other suitable high durability front surfaces include Sapphire coatings, Diamond-like coatings, Conturan® Daro coatings as supplied by SCHOTT North America Inc. of Elmsford, N.Y., and other coatings and glass types.

The beam blocker 24 which may be disposed opposite the front surface of the lens to intercept light reflected from the lens, has a novel configuration in that it is configured to be essentially transparent to collect the light incident on it, rather than opaque and absorbent, as in conventional prior art beam blockers. As will be shown in the detailed drawings of FIGS. 3 to 5 below, the light 28 transmitted past the beam blocker front surface 24 is detected by a photo-detector 29, such as a photo-voltaic cell. The photo-detector can be disposed either immediately behind the beam blocker front surface, as shown in FIG. 2, or the beam blocker may even be the front surface cover of the photodetector, or the photodetector can be at the remote end of a light guide which can also function as a beam scrambler, or it can surround the entrance pupil. A fuller explanation of the use of a photovoltaic detector surrounding the entrance pupil is given in connection with FIG. 5 hereinbelow. The beam blocker 24 with its associated photovoltaic cell 29 can thus be used as an output coupler system, using the reflection from the front surface 23 of the input lens 21 as the light coupled out of the resonator. This novel system therefore, utilizes the intentionally non-suppressed or under-suppressed reflection of light from the front surface of the input lens in order to perform at least part of the power extraction from the laser resonator. The light collection system, such as a light guide, may also be configured to perform at least some of the functions of collecting the light impinging on the beam blocker, converting it into a flat profile beam, manipulating its size and directing it towards the photovoltaic cell.

The system shown in FIG. 2 is a safe system because the distributed resonator design of the system ensures that lasing light only impinges on the input lens from directions within a predefined field of view, as those directions are the only ones where clear line of sight exists between both retro reflective members of the resonator. Lasing can thus only occur from a predefined solid angle when looking from the receiver side, and it is therefore possible to position and size the beam blocker so that it blocks any reflections from the front surface originating from beams coming from within that field of view, thus ensuring that only beams that will be blocked by the "smart" beam block could be transmitted to the receiver.

Reference is now made to FIG. 3, which is a schematic illustration of one exemplary implementation of such a receiver configuration. The receiver should be configured such that its entrance pupil is at the front surface of the input optical window, which could be the front surface of the focusing lens. The lasing beam 30 to and from the transmitter enters the front surface 23 of the lens 21, and is focused thereby towards the back mirror 31, the whole of this structure acting as a retroreflector. A folding mirror 32 may be conveniently disposed to preserve the thin geometry of the receiver configuration. The back mirror 31, disposed at the image plane of the input lens 21, passes the lasing beam back through the lens 21 and towards the transmitter unit. As the focusing element has a numerical aperture generally smaller than 0.01, focusing is rather weak. However it should be appreciated that typically the beam is 2-3 times wider at the transmitter compared to the receiver, and for a typically sized transmission distance of a few meters, the size of the beam 30 on the input surface 23 of the receiver optics 23, may be of the order of a millimeter or so.

Since, as described above, the front surface 23 of the lens may not necessarily be anti-reflection coated, a percentage of the incoming beam is reflected therefrom, and into the front surface 34 of the beam reflection blocker. The photovoltaic cell to extract this output coupled light may be situated immediately behind this front surface 34, but this location may be inconvenient for the aesthetic and size design considerations of a mobile device. Therefore, in the implementation shown in FIG. 3, the photo-voltaic cell 36 is situated at the end of a first light pipe 33. This allows for more flexible location of the photo-voltaic cell in the mobile device. Since the light pipe 33 collects light reflected externally from the front surface 23 of the lens, this light pipe is known as the external reflection light pipe. The collected light may then be directed by means of a high reflectivity surface 35 down the length of the light pipe, towards a first photodetector 36 situated at the end of the light collector. The side walls 37 of the light pipe, except the input window and the folding mirror surface, may be textured in order to scramble the light beam in order to convert the input laser beam, which may have a profile close to a Gaussian mode, to a top-hat profile in order to produce a more uniform incident flux on the photovoltaic detector. This beam profile will increase the conversion efficiency of the photovoltaic cell, since the entire surface can then be used at its optimum efficiency without needing to limit the photocell characteristics to match the beam intensity over a small central area of its surface where the beam intensity may be substantially higher than in the peripheral areas of the detector. The smaller the cross section of the light guide 33, the larger the number of reflections the traversing light makes off its side walls, and the more homogeneous the beam incident on the photovoltaic cell 36. To maintain minimum height from the receiver surface, the light guide should be positioned as close as possible to the lens, but without blocking the desired field of view. A lower profile beam blocking arrangement than that of the prior art beam blockers is achieved because the light guide/baffle/collector is placed as close as possible to the front surface. Since the front surface has a minimal size, the light pipe height is also minimal.

In addition to the external front surface output coupler arrangement, this novel type of system may also have a second collection system to collect the light reflected from the inner surface of the input lens 21, incident thereupon from the retroreflector 31. This generates additional output coupling from inside the receiver unit. This internal output coupler arrangement may include a second light pipe 38, known as the internal reflection light pipe. It may have the same features as the external light pipe, and it is terminated in its own photodetector 39. The output coupling is thus performed by adding the power collected at both the photodetectors 36, 39.

The reflectivity of the front surface 23 of the lens 21 should be selected so that the output coupling is configured to be somewhat more than the optimal level for the gain medium taking into account dust, fingerprints and other contaminations on the surface, in order to provide increased safety. Since the transmitter in the distributed lasing systems of the type described in this application generally use a thin disk gain media, which has low saturated gain—typically less than 1 dB—a total output coupling, including power losses, of more than 10 to 15% will typically terminate lasing, or at least reduce the power significantly.

Although the above described beam reflection blockers may transmit most of the reflected energy to the photovoltaic energy collection system, for use in powering the device in which the receiver is installed, it may also transmit some of the energy to a monitoring system, which can be used, for instance, for monitoring the status of the input surface of the focusing element, such as due to dirt, fingerprints, and the like, or for detecting transmissions such as data transmissions from the transmitter. Furthermore, the front surfaces of the reflection beam blockers 34 may be diffusing surfaces, such as to assist in the scrambling of the detected beam.

Figure 4:
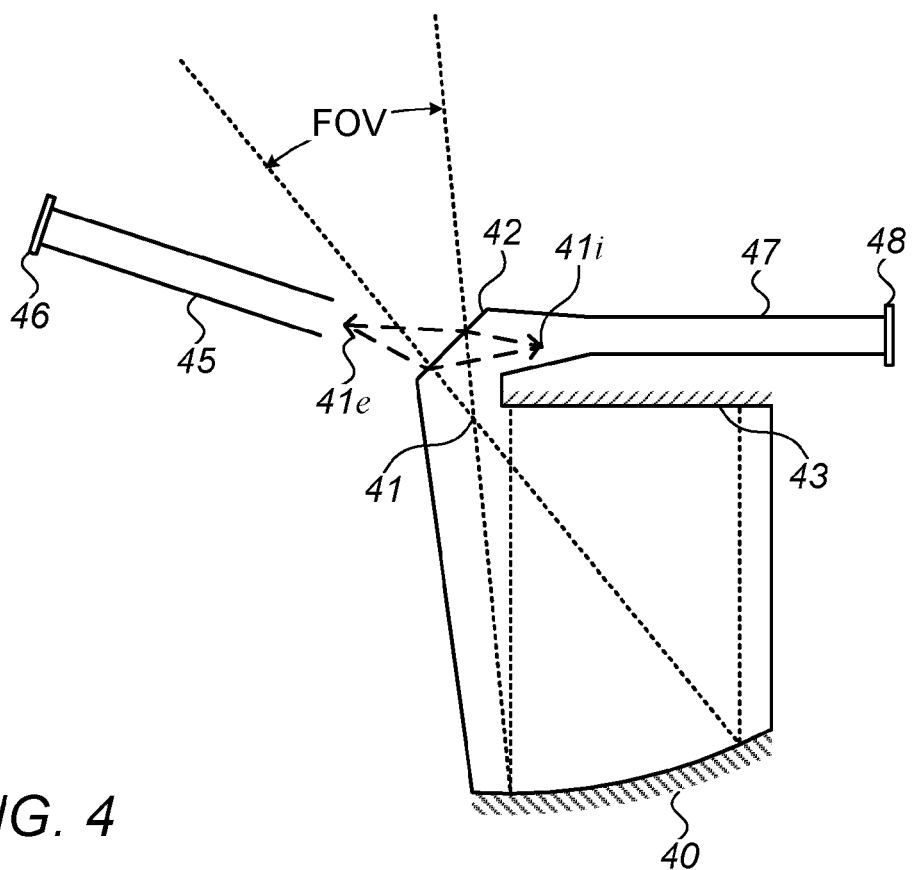
FIG. 4 is a detailed schematic illustration of another exemplary implementation of the receiver configuration shown in FIG. 2, using a reflective focusing element.

Reference is now made to FIG. 4, which schematically illustrates an alternative receiver configuration, in which a reflective mirror surface 40 is used as the focusing element instead of the lens of the implementation of FIG. 3. The implementation shown in FIG. 4 is especially convenient in that the optical assembly can be constructed of a single piece of transparent materials such as glass, with optical fibers attached thereto for conveying the output coupled light to the photo voltaic detectors. An input beam within the field of view, FOV, is incident on the input entrance surface, 40 which is a plane transparent window 42. The optical properties of the window should be adapted to withstand the handling environment of the mobile device such as a cellular telephone in which it is installed, and may be advantageously constructed of Gorilla Glass®, or a scratch resistant coating on the outer surface of the focusing block. A plane mirror surface 43 in conjunction with a parabolic focusing mirror surface 40, generates the retro-reflected beam. The input pupil 41, is located just inside of the entrance window 42.

The light of the input beam reflected from the front surface of the input window 42, which is typically in the region of 3% to 15%, converges on the external image of the pupil 41e, and is directed into the external reflection light guide 45, which can conveniently be an optical fiber, which conveys the illumination to an external photovoltaic cell 46. The light from the retro-reflected beam, reflected from the inner surface of the input window surface 42, converges on the internal image of the pupil 41i, and is directed into the internal reflection light guide 47 where it is conveyed to the internal photovoltaic cell 48. Although the light guides are schematically shown in FIG. 4 as fibers, it is to be understood that they can be configured as solid light guides to fit the space limitations of a cellular phone, for instance, by means of a designed shape, the use of at least one highly reflecting surface, and textured sidewalls, in the same way as was described for the light guides of FIG. 3.

In all of the above described configurations, single photovoltaic cells are preferably used at each photovoltaic location, rather than multiple photovoltaic cells, since efficiency drops significantly using multiple cells for the following reasons.
1. Light falling on "gaps" between the cells is not converted to electrical power, and is lost.
2. Such multiple cells would need to be connected either in series or in parallel. If connected in series, the current flowing would be limited to the current generated by the cell producing the least amount of current, to the limit that if one cell is not illuminated at all, the system would not generate any power. Thus, any inhomogeneity in the beam would reduce system efficiency.
3. On the other hand, series connection would have the disadvantage that the voltage generated by the cells would essentially be equal to that produced by a single cell, with added loss attributed to the power lost to gaps and to the added complexity.

In cases where multiple photovoltaic cells must be used, such as if a large area has to be covered, then such cells must be connected in parallel and packed as closely as possible.

The above described receiver examples incorporate two separate output coupling systems, each with its own photovoltaic cell. The ratio of light falling on the two cells is fixed, and is determined by the optical properties of the front surface coating. The cells can therefore be connected in series, each with its own DC/DC converter to match the currents of both cells.

In order to ensure that a lasing beam impinges on the receiver input while fulfilling the criteria described in connection with FIG. 2, the transmitter is equipped with a dynamic focusing system. The simplest way of achieving this is by obtaining a measure of the spot size on the receiver input, and providing feedback to the transmitter to maintain the spot size at its predetermined level. There are several possible ways of achieving this, such as:
(a) Measurement of the beam size at the transmitter. This is directly proportional to the focused beam size at the receiver, since the resonator is stable.
(b) Measurement of the power detected in the receiver, and transmission of a signal to the transmitter which is used to maximize that detected power.
(c) Measurement of the power circulating within the resonator, i.e. between the transmitter and receiver, since this is proportional to the output coupled power. This power is most conveniently measured at the transmitter output.
Any form of autofocus may be used in the transmitter, actuated by the feedback signal generated by one of the above three methods, or an alternative suitable method.

Figure 5A:
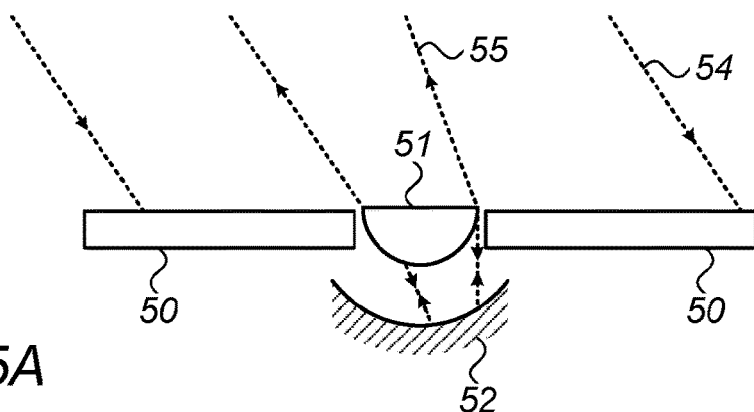
FIG. 5A is a schematic illustration of the general use of a small centrally located retro-reflecting region in the center of a photovoltaic output coupler.

Reference is now made to FIG. 5A which illustrates schematically an implementation in which a retroreflector is used, operative over only a small part of the area of the laser beam incident on the input aperture, most conveniently over the center area, with a photovoltaic cell covering the rest of the area, such that the output coupling ratio will be very high, possibly up to 85 or 90% or even more. The photovoltaic cell 50 covers most of the area of the optical input aperture of the device, and at the center of the photovoltaic cell, there is situated the input lens 51 with a back mirror 52 disposed at its focal length behind it. Since the input pupil of the receiver optical system is situated at the front surface of the lens, the lens/back mirror combination constitutes the retroreflector of the lasing system receiver. The retroreflector thus covers only a small part of the input beam 54, and since the power density of the input beam is highest at its center, in order to retroreflect a desired percentage of the total power of the input beam, which could be of the order of 10 to 40% of the beam, the area of the retroreflector can be even smaller than that expected from a simple geometric ratio based on percentage of power to be reflected. The retro-reflected beam 55, then diverges back towards the transmitter, and if the gain medium has sufficient gain, it is again amplified and returned by the retroreflector in the transmitter to the input aperture of the receiver, where again the major part of the incident beam is absorbed by the photvoltaic cell and the smaller part is reflected back towards the transmitter, and so on. The large area photovoltaic cell thus acts as a high ratio output coupler for the incident beam from the transmitter, extracting power from the cavity for charging the mobile device.

For such a system to operate, the entrance pupil must reside very close to the surface of the beam block, whether photovoltaic sensors, a diffuser or a front window. If the pupil resides below or above the surface then the area of the focusing element 51 on the surface would have to increase to cover beams coming from different directions. In such a case, the excess power falling outside of the focussing element 51, that should be blocked by the beam block, would be significantly smaller.

Figure 5B:
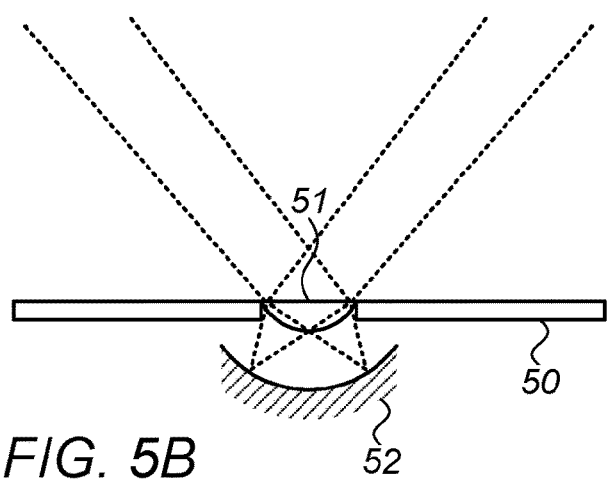
Figure 5C:
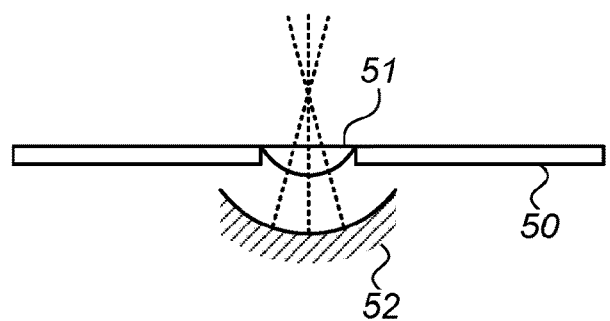
FIG. 5C illustrates the case with the entrance pupil above the surface.

This can be illustrated in FIGS. 5B and 5C, where FIG. 5B illustrates the case with the pupil on the surface, such that the aperture equals that portion of the beam to be reflected, while FIG. 5C illustrates the case with the pupil above (though a similar effect would be obtained with the pupil below) the surface, in which case the aperture size is bigger than the designed beam.

Figure 5D:
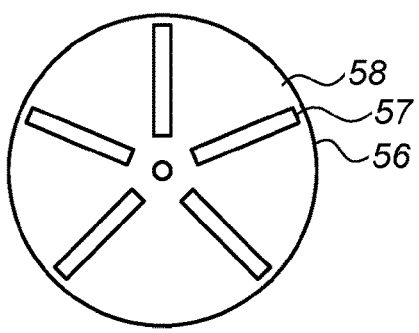
FIG. 5D is a plan view of an alternative construction of the optical input aperture in which a number of retro-reflecting elements are arranged around the center of the input aperture, while the rest of the area is taken up by the photovoltaic cell output coupler arrangement.

The implementation of FIG. 5A is only one method by which a retro-reflecting element having a substantially smaller area than the output coupling element can be constructed, in order to achieve a high output coupling ratio. Reference is now made to FIG. 5D which is a plan view of an alternative construction of the optical input aperture 56 of a receiver of the present disclosure, in which a number of retro-reflecting elements 57 are arranged in a radial pattern around the center of the input aperture, while the rest of the area is taken up by a photovoltaic cell arrangement 58 as the output coupler. Each of the retroreflector elements can be directed at a different region of the field of view to increase the coverage of the field of view of the system. The pattern shown in FIG. 5D is meant to illustrate an exemplary pattern of retroreflector in a matrix of photovoltaic cells, and it is to be understood that any other arrangement can equally well be used, while maintaining the It should be noted that the implementations of FIGS. 5A and 5D, in which the position of the photovoltaic cell arrangements is shown to be in the same plane as the retroreflector, is not intended to be a definitive position for these beam output couplers. The novelty of the implementations shown in FIGS. 5A and 5D is intended to be in the output coupling ratio used, which is substantially higher than is generally used in the prior art. The photovoltaic cells could equally well be behind a transparent window and at a remote position in the receiver, at the end of a light pipe or waveguide, as shown in FIGS. 3 and 4. The important feature of the implementations of FIGS. 5A and 5D lies in the ratio of the area of the retro-reflecting surface or surfaces, to that of the output coupling surface or surfaces.

One additional advantage of the type of implementations of FIGS. 5A and 5D is that they are inherently safer than the previous implementations, and in most cases, where the lasing takes place outside of the visible range, such as at 1350 nm, do not even need a baffle in order to absorb any unwanted light reflected from the input aperture lens. This arises because of the very small area of retro-reflecting surface to which the beam is exposed. In the implementations of FIGS. 5A and 5D, the photovoltaic cells are highly absorbing and therefore do not reflect any significant level of the incident level beam. Therefore essentially the only stray reflected light comes from the front surface of the input lens, which has a very small area. If the area is only 10% of the total input aperture, then 4% of reflected light from a typical glass front surface of the lens represents only 0.4% of the transmitted lasing beam, which may be well below the maximum permissible exposure at the near infrared wavelengths used. In contrast to this if a low output coupling ratio is used, the area from which light can be reflected may be close to 100% of the aperture, and 4% reflected stray light may generally be unacceptable.

Figure 6A:
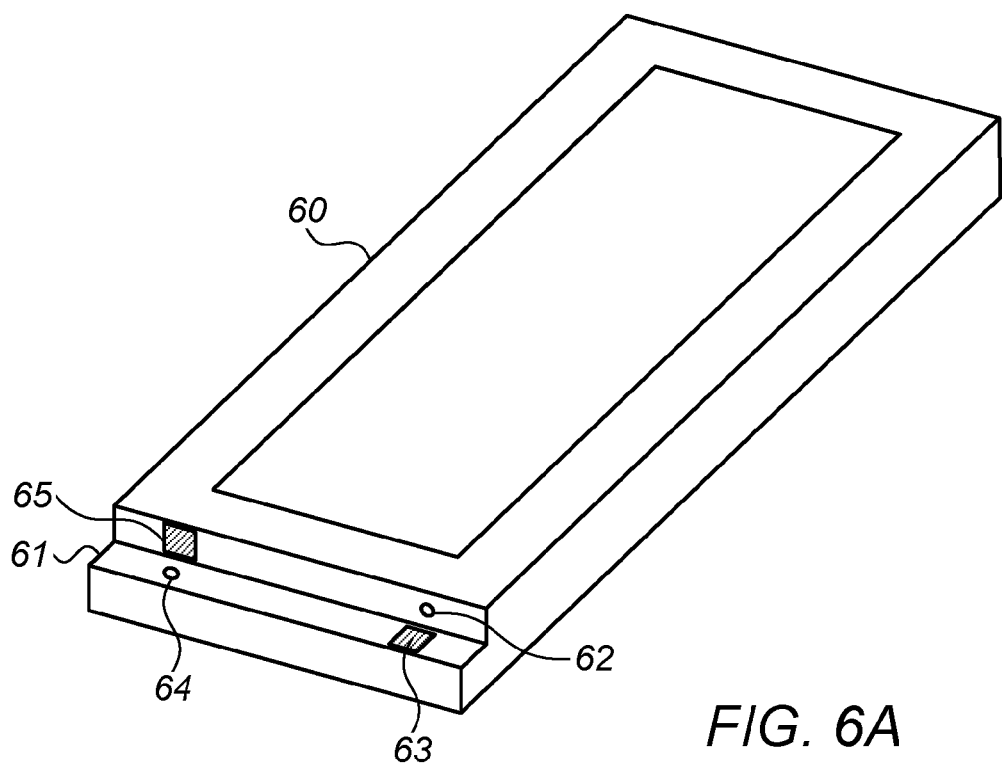
FIGS. 6A, 6B and 6C show possible configurations of the locations of the entrance aperture and the beam blocker on exemplary mobile phones.
Figure 6B:
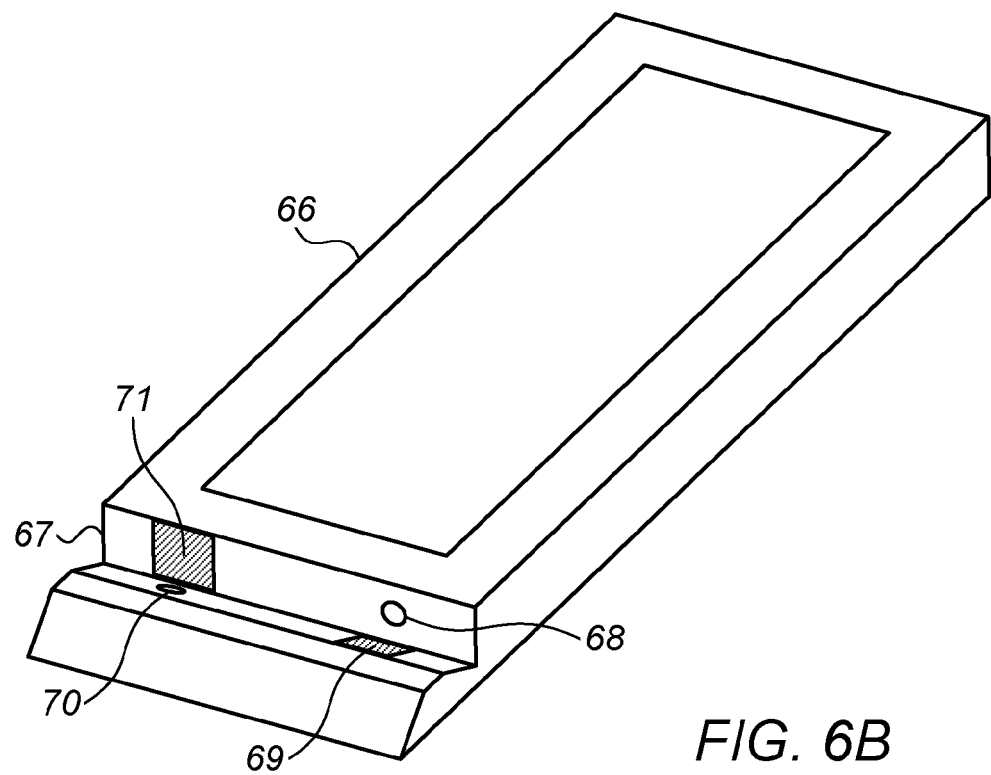

Reference is now made to FIGS. 6A and 6B which show possible configurations of installing the entrance aperture and the beam blocker of a receiver for a distributed resonator embedded in an exemplary cellular telephone. Since the beam blocker generally masks one lateral side of the beam transmission, it is necessary to provide at least two input apertures facing opposite directions, each with its own beam blocker in order to provide all-around coverage to receive the transmitted beam. In the sample phone 60 shown in FIG. 6A, the optical input apertures of the lasing receivers are located in a stepped structure 61 at one end of the phone. One input aperture 62 is located in a step perpendicular to the face of the phone with its blocker 63 located opposite it on a step parallel to the face of the phone, while the other input aperture 64 is located on the step parallel to the face of the phone with its blocker 65 on the step perpendicular to the face of the phone. By this means, the field of view of the receiver extends from the plane parallel to the face of the phone to that perpendicular to the face of the phone.

In the sample phone 66 shown in FIG. 6B, the optical input apertures of the lasing receivers are located in a V-shaped groove 67 across the width of the phone. The first input aperture 68 and its associated blocker 69 are located on opposite sides of the groove at one position across the width of the phone, while the other input aperture 17 and its associated blocker 71 are also located on opposite sides of the groove, at a different position across the width of the phone, but facing the reverse direction to those of the first input aperture 68 and its associated blocker 69. In this configuration also, depending on the included angle of the groove, the field of view of the receiver extends over approximately 90° centered on the perpendicular to the face of the phone.

Figure 6C:
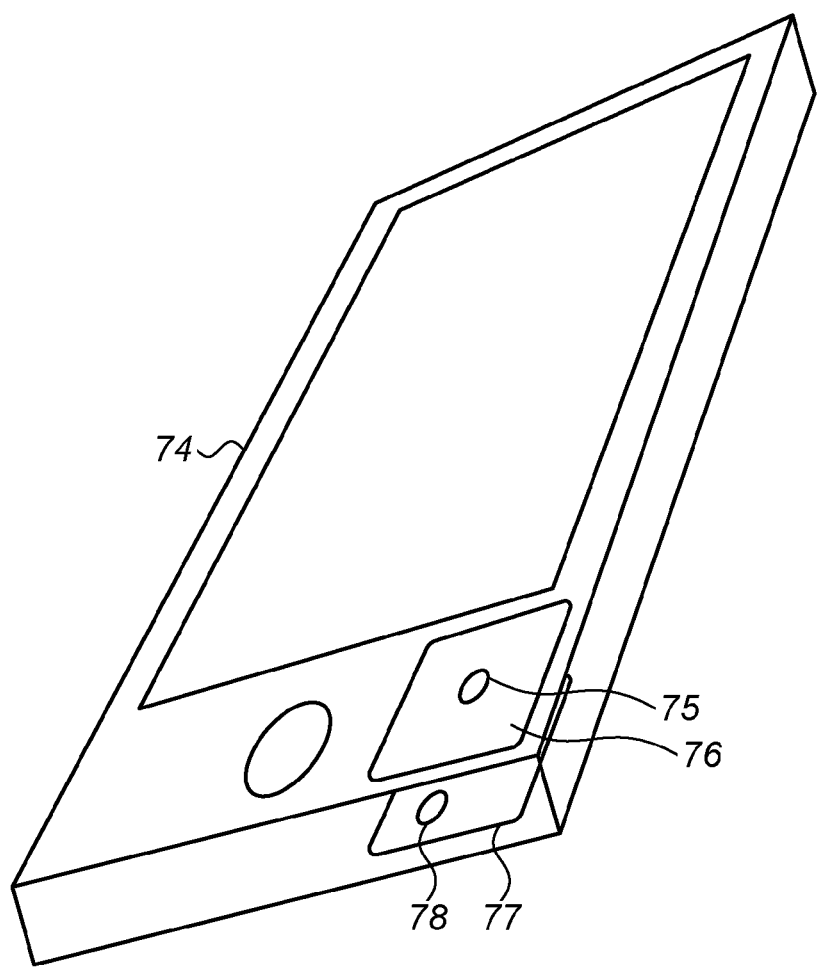

In the sample phone 74 shown in FIG. 6C, the phone has a very small retro reflector 75. The front surface window 76 may include a diffuser and scratch resistant coating as well as possible detection mechanisms for contamination. A photovoltaic cell 77 is shielded from the user and a detector 78 used to further detect reflective contaminations on the surface is also shown. Retro reflector 75 returns the central portion of the incoming beam, creating a feedback signal to allow lasing to commence. The front surface 76 absorbs the rest of the beam and converts it to electrical power. The reminding photons that are not absorbed or transmitted to an absorber behind front surface 76, are reflected by front surface 76 and diffused by it. Radiation impinging on front surface 76 is mostly absorbed, but the remaining photons reflected by it are diffused so that they cannot form a safety hazard.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

The invention claimed is:

1. A receiver for receiving an incident beam of optical power from a remote transmitter over a predefined field of view, said receiver comprising:
    an optical input element having an external optical surface selected to withstand a predetermined level of handling;
    at least one photovoltaic cell disposed within said receiver, inwardly to said optical input element, to convert light from said incident beam into electricity; and
    a retroreflector disposed inwardly to said external optical surface, and covering a part of the area of the input aperture, such that it reflects only a minor portion of said incident beam of optical power, said reflected incident beam thereby diverging back towards said transmitter, therein creating a feedback signal to allow lasing to commence.

2. The receiver according to claim 1, wherein said external optical surface selected to withstand a predetermined level of handling has a predetermined mechanical durability.

3. The receiver according to claim 1, wherein said external optical surface selected to withstand a predetermined level of handling is operative with at least one of a predetermined level of scratches, spills and fingerprints.

4. The receiver according to claim 1, wherein said transparent optical impingement surface is the entrance window of said at least one photovoltaic cell.

5. The receiver according to claim 1, wherein said optical input element having an external optical surface is the entrance window of a light guide, having said at least one photovoltaic cell disposed at an end of said light guide remote from said transparent optical impingement surface.

6. The receiver according to claim 1, wherein said external optical surface comprises either a glass produced to have a high resistance to mechanical damage or a glass having a scratch resistant coating thereupon.

7. The receiver according to claim 1, wherein said predetermined level of handling is determined according to the expected effects of domestic use of said receiver.

8. The receiver according to claim 1, wherein said retroreflector causes said reflection to diverge back towards said transmitter, even if said incident beam is essentially collimated.

* * * * *